Oct. 28, 1947.                L. DEWAN                 2,429,807
                          HYSTERESIS MOTOR
                       Filed March 23, 1946
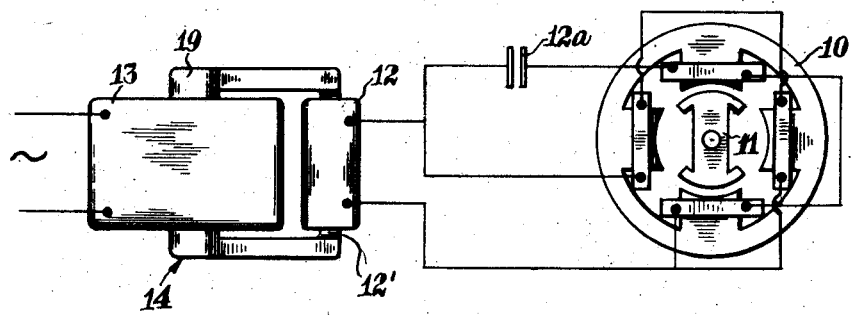
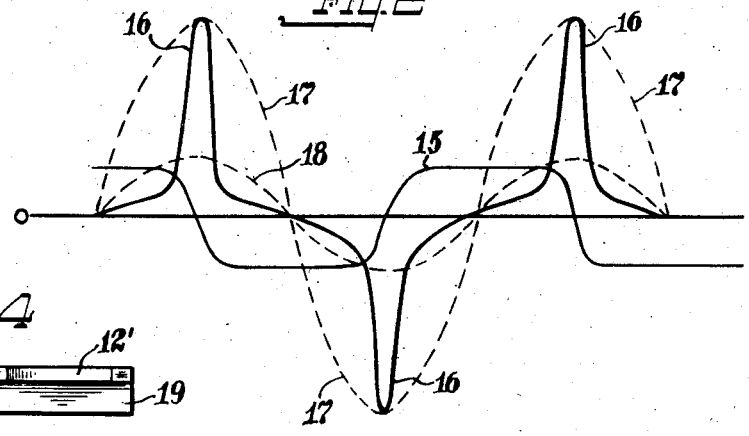
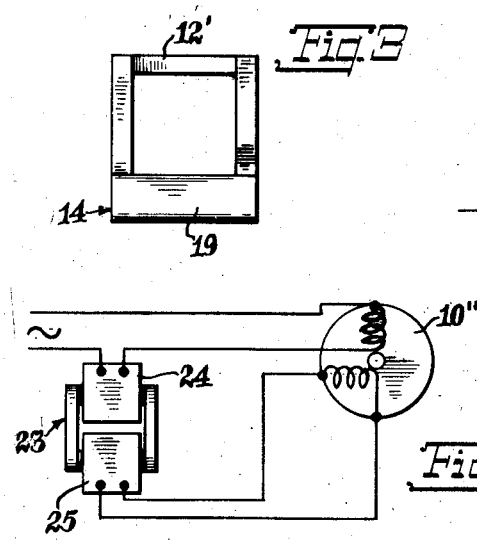
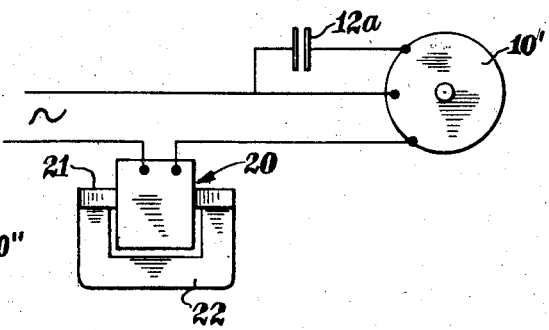
INVENTOR
LEON DEWAN
BY
Edw. S. Higgins
ATTORNEY Patented Oct. 28, 1947

2,429,807

UNITED STATES PATENT OFFICE 2,429,807

HYSTERESIS MOTOR

Leon Dewan, New York, N. Y., assignor of one-half to Percival W. Andrews, New York, N. Y.

Application March 23, 1946, Serial No. 656,573

5 Claims. (Cl. 318—166)

This invention relates specifically to electric motors of the synchronous type and its object is to provide a motor having greater efficiency and starting and synchronizing "pull-in" torque in the hysteresis type of synchronous motor and a sharper synchronism in other types of synchronous motor.

The prior art teaches that in the hysteresis motor, the starting torque and synchronism "pull-in" as well as the efficiency is increased by raising the magneto-motive force of the stator and thereby inducing stronger magnetic poles in the permanent magnet steel rotor. It has even been proposed to start a hysteresis motor at a high voltage and then reduce the same to below synchronism "pull-in" value in running to prevent the excessive heating that would result in maintaining the high voltage constantly.

Up to the present time, it has been customary to use the sine wave alternating current to operate synchronous motors. However, according to this invention, where a hysteresis type of motor employing a permanent magnet steel rotor is used, a current is produced which is substantially flat during each half cycle except at the middle period thereof wherein a sharp peak is produced raising the magnetizing power of the stator to a high degree for a brief instant at each half cycle.

A saturable core transformer is used to induce such a peaked voltage wave at the secondary, the core being saturated a good part of the time by the primary coil connected to the current supply, the voltage peaks being produced at the periods when the flux is suddenly reversed.

Fig. 1 is a diagram showing the motor and transformer to operate the same from an A. C. supply.

Fig. 2 is a diagram illustrating the magnetic and electrical action of the system.

Fig. 3 is a diagram showing a form of core that may be used for the saturable core transformer of Fig. 1.

Fig. 4 is a view from above Fig. 3.

Fig. 5 is a diagram illustrating an alternative method of deriving the current of the desired wave form.

Fig. 6 is a diagram illustrating a modified application of the invention.

In the drawing, the hysteresis motor 10 having a rotor 11 of permanent magnet steel and formed to have salient pole characteristics is powered by a transformer having a secondary 12 in which is the condenser 12a for splitting the phase, a primary coil 13 connected to the A. C. supply and a core 14, the relation of the size of the core to the magnetic field produced by the A. C. in primary coil being such that the leg 12' of the core in the secondary coil is saturated when the strength of the A. C. supply current has only partly risen. In Fig. 2, the curve 15 illustrates the magnetic flux in the core leg resulting from the primary magnetizing current. This induces a voltage in the secondary coil corresponding to the curve 16 in which the voltage rises abruptly to a high point within a limited time of each half cycle period to produce a strong brief magneto-motive force in the stator of the hysteresis motor.

In the present invention, the high permanent magnetism induced by the peak of wave 16 is equal to that produced by a sine wave of the same value as that shown in curve 17 and the efficiency is correspondingly high. Yet the power or heating value of the current is more nearly that of a much lower voltage wave such as that shown in curve 18.

In actual practice a small hysteresis motor loaded with a fan has been run in the old manner and according to this invention for sake of comparison. With the usual sine wave supply it required about 5 amperes at 12 volts to cause the motor to pull into synchronism. With this invention, it required 4 amperes at 10 volts. Taking $I^2R$ as a basis, the difference in efficiency would be as 16 is to 25.

The core 14 of the transformer of Fig. 1 may be formed if desired as in Figures 4 and 5. The leg 19 on which the primary coil is wound is heavier than the rest so that the induction therein is greater and prevents too great a surge of current in each half cycle in the primary coil. As the current rises from zero a point is reached when the leg on which the secondary coil is wound becomes saturated while the leg on which the primary coil is wound does not reach saturation till later on, at the peak of the A. C. wave and in the meantime continues to offer a counter E. M. F. to the primary current to prevent excessive heating.

An alternate method of producing the desired current is shown in Fig. 5 where the motor 10' is powered from an A. C. source in series with a reactor 20 having a saturable core 21. The leg 22 which conducts the flux however is not saturable but is heavy enough to cause saturation of the reactor leg at a comparatively low current and thereby permit the reactor coil to have fewer ampere turns and resistance to produce the required result.

Fig. 6 illustrates a modification whereby the required result of the invention is produced and at the same time the condenser for producing the split phase current is eliminated. The transformer 23 has a saturable core. The primary 24 is in series with one phase winding of the motor 10'' while the secondary 25 is separately connected to the other phase winding of the motor as shown. The currents in the primary 24 and secondary 25 differ in phase approximately 90° to produce the rotating magnetic field while the saturability of the core gives both currents the characteristic previously described.

While the invention has been described in connection with the hysteresis type of synchronous motor for the reasons explained, it may be seen that in other types of synchronous motor such as the synchronous induction type, the changes in phase angle of the motor due to load and current changes may be reduced, that is, the synchronism is rapidly held within a narrow phase angle.

I claim:

1. The combination of a hysteresis electric motor having a field winding and a core which is saturated under normal operating conditions transformer for producing an alternating current of a wave form of higher peak voltage than a sine wave alternating current of equal mean current value for energizing the field winding of said motor.

2. The combination of a hysteresis motor and means for producing therefor an alternating current whose voltage peaks are at least twice as great as the mean effective voltage including a transformer having a core which is saturated under normal operating conditions.

3. The combination of a hysteresis motor and means for producing an alternating current therefor whose current peaks are at least twice as great as the mean effective current including a transformer having a core which is saturated under normal operating conditions.

4. The combination of a hysteresis motor having a polyphase winding, a core which is saturated under normal operating conditions transformer having a primary winding and a secondary winding, the primary winding of said transformer being connected with one phase winding of the motor and the secondary winding being connected with the other phase winding of the motor.

5. The combination with a synchronous motor of the hysteresis type of a transformer including a primary coil and a secondary coil, the leg on which the primary coil is wound being greater in cross-section than the leg on which the secondary coil is wound whereby the latter leg is saturated under normal operating conditions.

LEON DEWAN.

REFERENCES CITED

The following references are of record in the file of this patent:

UNITED STATES PATENTS

| Number | Name | Date |
| --- | --- | --- |
| 505,859 | Stanley et al. | Oct. 3, 1893 |
| 1,728,003 | Nickle | Sept. 10, 1929 |
| 2,257,158 | Cooley | Sept. 30, 1941 |

FOREIGN PATENTS

| Number | Country | Date |
| --- | --- | --- |
| 454,620 | France | May 2, 1913 |